(12) United States Patent
Gildein et al.

(10) Patent No.: US 12,554,591 B2
(45) Date of Patent: Feb. 17, 2026

(54) DYNAMIC ADAPTATION OF BACKUP POLICY SCHEMES BASED ON THREAT CONFIDENCE

(71) Applicant: International Business Machines Corporation, Armonk, NY (US)

(72) Inventors: Michael E. Gildein, Wappingers Falls, NY (US); Tabari Alexander, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 18/471,833

(22) Filed: Sep. 21, 2023

(65) Prior Publication Data

US 2025/0103438 A1  Mar. 27, 2025

(51) Int. Cl.
*G06F 11/14* (2006.01)
*G06F 11/1446* (2026.01)

(52) U.S. Cl.
CPC ...... *G06F 11/1461* (2013.01); *G06F 11/1451* (2013.01)

(58) Field of Classification Search
None
See application file for complete search history.

(56) References Cited

U.S. PATENT DOCUMENTS

| | | | |
|---|---|---|---|
| 10,887,339 B1 | 1/2021 | Sokolov et al. | |
| 11,010,260 B1* | 5/2021 | Savir | G06F 11/3452 |
| 11,113,148 B2 | 9/2021 | Dain et al. | |
| 11,275,834 B1 | 3/2022 | Offer et al. | |
| 11,537,713 B2 | 12/2022 | Rajasekharan et al. | |
| 11,601,443 B2 | 3/2023 | Strogov et al. | |
| 11,783,036 B2* | 10/2023 | Chen | G06F 21/565 |
| | | | 726/23 |
| 2017/0223031 A1 | 8/2017 | Gu et al. | |
| 2018/0024893 A1* | 1/2018 | Sella | G06F 11/1458 |
| | | | 707/648 |
| 2019/0236274 A1* | 8/2019 | Brenner | G06F 21/6245 |
| 2019/0354443 A1* | 11/2019 | Haustein | G06F 11/1451 |
| 2021/0049075 A1* | 2/2021 | Gibbons, Jr. | G06F 11/1471 |
| 2022/0100858 A1* | 3/2022 | Todd | G06F 21/57 |
| 2024/0070034 A1* | 2/2024 | Bell | G06N 20/00 |

OTHER PUBLICATIONS

Buchholz et al., "On the role of file system metadata in digital forensics." Digital investigation 1.4 Year: 2004, pp. 1-15.
International Searching Authority, "Notification of Transmittal of the International Search Report and the Written Opinion of the International Searching Authority, or Declaration," Patent Cooperation Treaty, Nov. 21, 2024, 10 pages, International Application No. PCT/EP2024/073548.

* cited by examiner

*Primary Examiner* — Arpan P. Savla
*Assistant Examiner* — Edmund H Kwong
(74) *Attorney, Agent, or Firm* — Patterson + Sheridan, LLP

(57) ABSTRACT

Method and apparatus for data backup. A first backup of a computing system is generated at a first time. A first confidence of compromise level of the computing system for the first time is generated. The first backup is stored along with metadata, where the metadata comprises the first confidence of compromise level of the computing system at the first time. In response to evaluating the first confidence of compromise level based on one or more backup criteria, a backup policy of the computing system is modified.

19 Claims, 8 Drawing Sheets

DYNAMIC ADAPTATION OF BACKUP POLICY SCHEMES BASED ON THREAT CONFIDENCE

BACKGROUND

The present disclosure relates to computing system data backup, and more specifically, to dynamically adjusting computing system data backup policies based on threat confidence.

Conventional data backup systems typically operate on the basis of a fixed plan or specific criteria that trigger their actions. For example, time-based backups are implemented according to a fixed timesheet and initiate a backup procedure at regular time intervals, such as daily, weekly, or even hourly, depending on the requirements of the computing system. Event-based backup systems, in contrast, initiate their procedures in response to specific events or modifications within the system, such as significant modifications to existing files, a large influx of new data exceeding a predetermined threshold, or the installation of new software applications.

Despite their respective strengths, both types of systems operate within a rigid framework. In other words, conventional backup systems do not adapt their behavior in response to changes or potential threats in the system's security environment. They proceed without considering the system's security status or potential threats, which may lead to scenarios where backups include data that has been compromised, or where uncompromised data is overwritten by compromised data. Given the dynamic and ever-changing nature of cybersecurity threats, it has become increasingly important to develop more responsive and adaptable backup strategies that are capable of adjusting their backup policies dynamically in response to detected potential security threats and vulnerabilities.

SUMMARY

One embodiment presented in this disclosure provides a method, including generating a first backup of a computing system at a first time, generating a first confidence of compromise level of the computing system for the first time, storing the first backup along with metadata comprising the first confidence of compromise level of the computing system at the first time, and in response to evaluating the first confidence of compromise level based on one or more dynamic backup policy criteria, modifying a backup policy of the computing system. One advantage provided by such an embodiment is more effective and security-focused data backup and synchronization.

In another embodiment, one or more of the following features may be included. The method may further include, upon determining that the first confidence of compromise level satisfies the one or more dynamic backup policy criteria, storing the first backup and a second backup for forensic analysis, wherein the second backup corresponds to an immediately preceding backup, relative to the first backup. The provided embodiment facilitates more efficient identification of potential security risks, and further enables a detailed forensic analysis using the stored backups.

In another embodiment, one or more of the following features may be included. The method may further include, upon determining that the first confidence of compromise level is a minimum across existing backups of the computing system, retaining the first backup of data. The provided embodiment optimizes the backup storage space and reduces the risk of data loss by retaining the backups with comparatively lower confidence of compromise levels. In another embodiment, one or more of the following features may be included. The method may further include, notifying one or more other computing systems of the modified backup policy and evaluation results, where the one or more other computing systems are in a clustered system with the computing system, and each of the one or more other computing systems, upon receiving notifications, tags at least one respective backup with metadata indicating the modified backup policy and the evaluation results, and may adjust a frequency of backups in response to the modified backup policy and the evaluation results. By sharing the evaluation results or changes in backup policies with other computing systems within the network, the provided embodiment enables the other systems to quickly respond to potential security risks, therefore enhancing the overall network security. Furthermore, in another embodiment, the method may further include, notifying one or more other computing systems of the modified backup policy and evaluation results, where the one or more other computing systems share access to data stored in one or more backup sets with the computing system.

Another embodiment presented in this disclosure provides a method, including generating a first backup of a computing system at a first time, generating a first confidence of compromise level of the computing system for the first time, storing the first backup along with metadata comprising the first confidence of compromise level of the computing system at the first time, generating a second backup of the computing system at a second time, where the second backup is an immediately preceding backup relative to the first backup, storing the second backup with metadata comprising a second confidence of compromise level of the computing system at the second time, comparing an increase from the second confidence of compromise level to the first confidence of compromise level with one or more significance criteria, and in response to comparison results, modifying a backup policy of the computing system. One advantage provided by such an embodiment is the monitoring of dynamic security confidence changes to proactively identify and flag potential risks in the data and systems being backed up.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs that, when executed by the one or more computer processors, perform an operation in accordance with one or more of the above methods.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DETAILED DESCRIPTION

Figure 1:
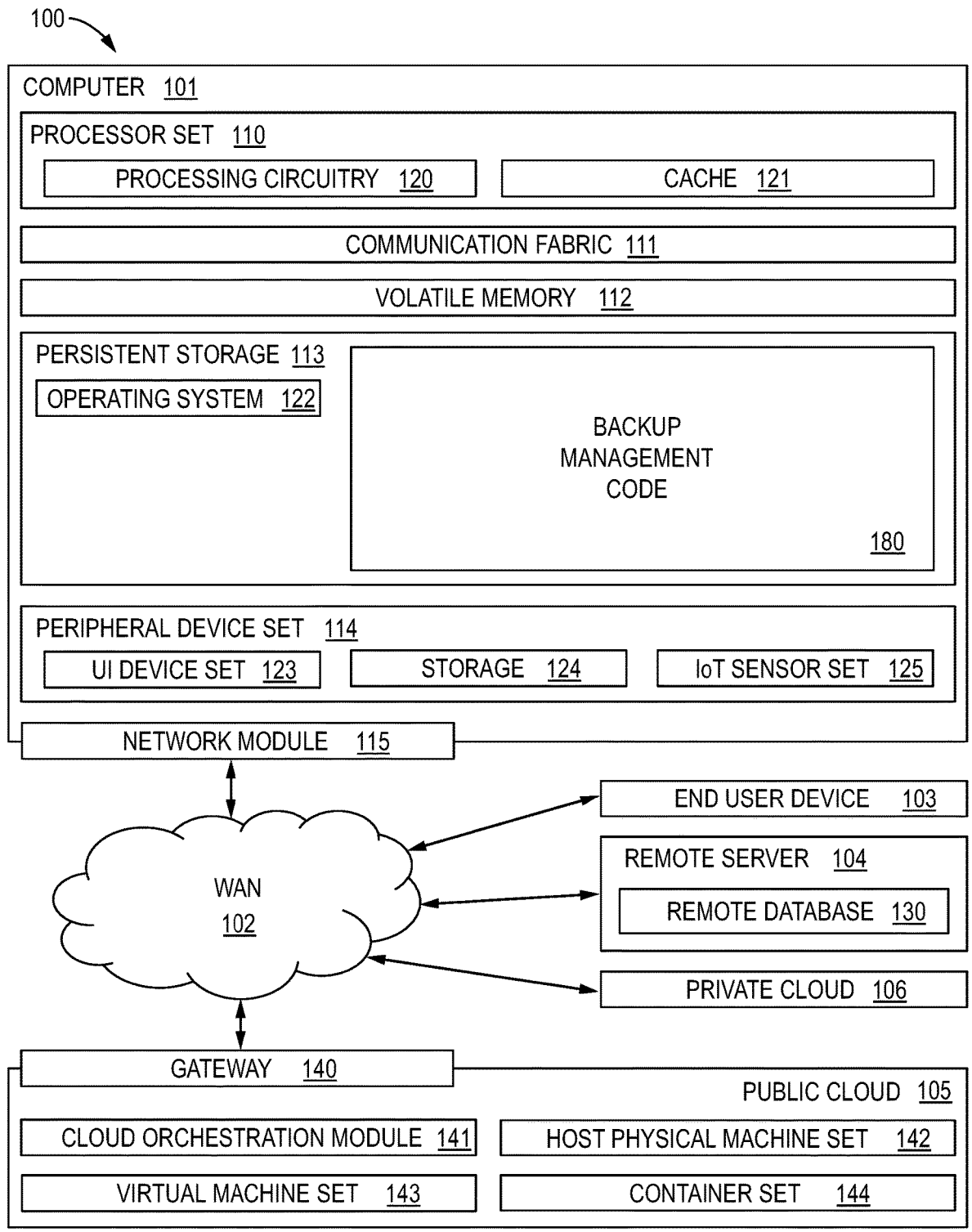
FIG. 1 depicts an example computing environment for the execution of at least some of the computer code involved in performing the inventive methods.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments herein describe a method or system for dynamically adjusting data backup policies. In one embodiment, the dynamic adjustment may be executed based on the collected security incident metrics and aggregated confidence of compromise level, both of which are stored within each backup's metadata. For example, the system may continuously monitor and collect metrics reflecting a data source system's security and integrity. By aggregating these metrics, the system may generate a compromise confidence score (also referred to in some embodiments as confidence of compromise level) that represents the overall compromise level or unsafe status of the data source system when a certain backup was made.

In one embodiment, the score may be compared with one or more backup criteria (e.g., a defined maximum allowable threshold) to determine if the backup meets a set security standard. If the compromise confidence score satisfies the backup criteria (e.g., surpassing (or is equal to) the defined maximum allowable threshold), it may indicate a significant security concern has been raised, and/or a potential breach has occurred in the data source system at the time when the backup was made. In response, the system may flag and save the current backup and the backup immediately preceding the current one for further forensic analysis. In some embodiments, the system may compare the current compromise confidence score with scores from all existing data backups. If the current score is the lowest across all existing backups, it may suggest that the current backup is most likely uncompromised (or is the backup that is least likely to be compromised) and therefore has a relatively higher integrity. The system may then maintain the current backup regardless of other backup retention policies (which may have otherwise caused the backup to be deleted). In some embodiments, the system may compare the current compromise confidence score with the score from the immediately preceding backup(s), to determine trends in system security. If a significant increase is observed from the immediately preceding backup to the current backup, it may indicate a potential breach has occurred and/or a serious security concern has been raised in the data source system. The system, in response, may flag and save the two neighboring backups (e.g., the current and immediately preceding backups) for further analysis. The continuous monitoring and dynamic adjustment in the disclosed system or method provide a responsive and comprehensive data backup strategy, significantly enhancing the overall data security and system reliability.

FIG. 1 depicts an example computing environment 100 for the execution of at least some of the computer code involved in performing the inventive methods.

Computing environment 100 contains an example of an environment for the execution of at least some of the computer code involved in performing the inventive methods, such as Backup Management Code 180. In addition to Backup Management Code 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Backup Management Code 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Backup Management Code 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in Backup Management Code 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
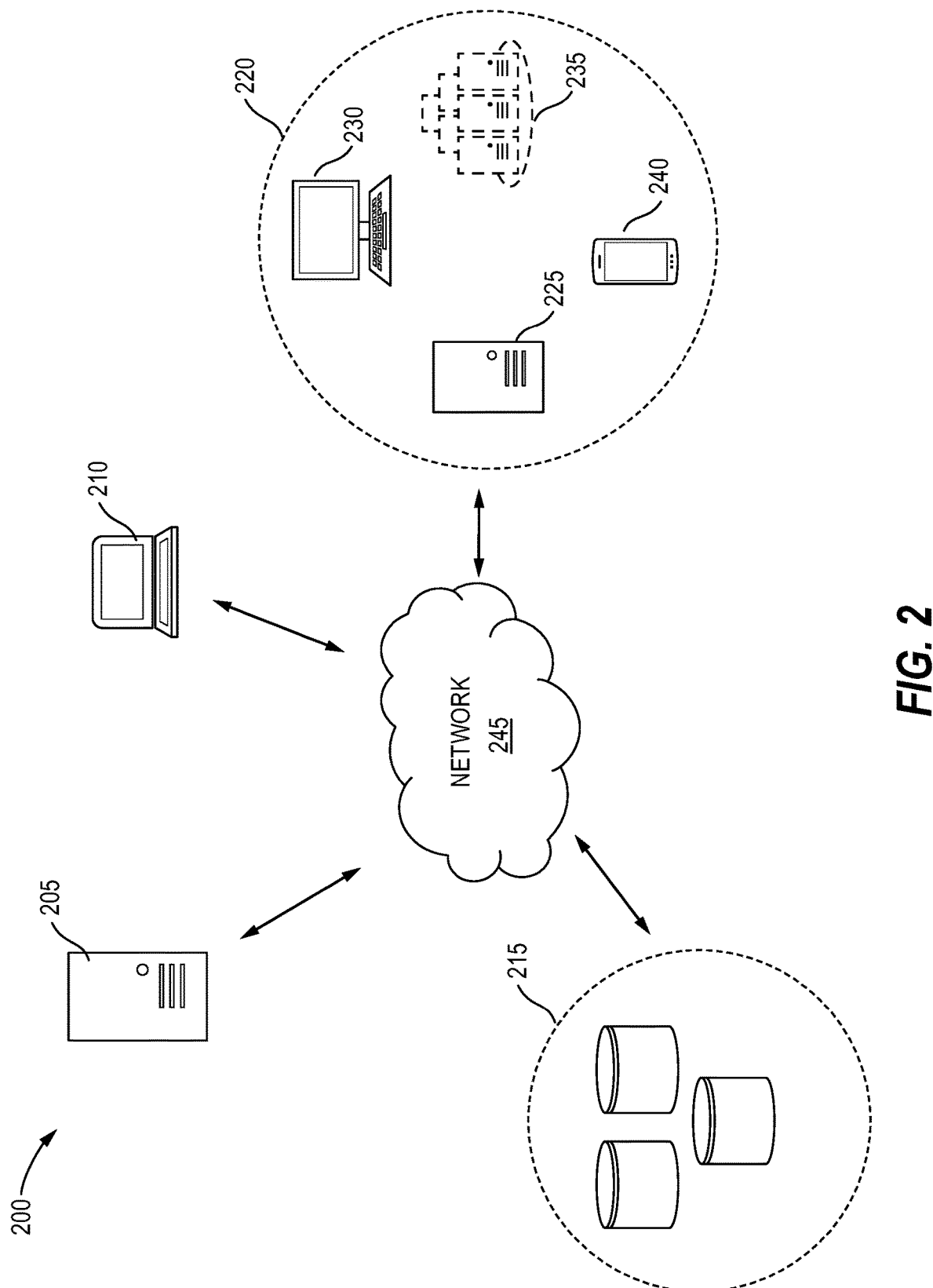
FIG. 2 depicts an example environment in which embodiments of the present disclosure may be implemented.

FIG. 2 depicts an example environment 200 in which embodiments of the present disclosure may be implemented. In the illustrated example, the environment 200 includes one or more backup management servers 205, one or more client devices 210, one or more data source systems 220 (e.g., application/database servers 225, individual computers 230, virtual machines 235, or mobile devices 240), and one or more storage devices 215 (e.g., network storages, or cloud storages).

In the illustrated example, the backup management servers (BMSs) 205 are coupled directly or indirectly to the client devices 210, the data source systems 220, and the storage devices 215 through a network 245. That is, the BMSs 205, the client devices 210, the data source systems 220, and the storage devices 215 may each be implemented using discrete hardware systems. The network 245 may include or correspond to a wide area network (WAN), a local area network (LAN), the Internet, an intranet, or any combination of suitable communication mediums that may be available, and may include wired, wireless, or a combination of wired and wireless links. The network 245 may provide connectivity for the various systems, components, or resources within the environment 200, and may be implemented using protocols such as Transmission Control Protocol (TCP) and/or Internet Protocol (IP). In some embodiments, the BMSs 205, the client devices 210, the data source systems 220, and the storage devices 215 may be local to each other (e.g., within the same local network and/or the same hardware system), and communicate with one another using any appropriate local communication medium, such as a local area network (LAN) (including a wireless local area network (WLAN)), hardwire, wireless link, or intranet, etc. In some embodiments, the environment 200 may represent a cloud computing environment, and the BMSs 205, the client devices 210, the data source systems 220, and the storage devices 215 may operate through a centralized cloud computing platform.

In the illustrated example, the BMS 205 may coordinate and manage the backup of data from one or more data source systems 220 to one or more storage devices 215. As used here, a data source system 220 may refer to any computing system, device, or network from which data is collected for the purpose of generating a backup. The data source systems 220 may include various types of systems and devices, such as application/database servers 225, individual computers or workstations 230, virtual machines 235 within a network, and mobile devices 240, among others. The BMS 205 may utilize various types of storage devices 215, such as hard disk drives (HDDs), solid-state drives (SSDs), network storage (e.g., network attached storage (NAS), storage area network (SAN), direct attached storage (DAS)), cloud storage, and the like. In some embodiments, the BMS 205 may perform backup scheduling regularly and automatically. For example, the BMS 205 may be programmed to perform backups at a specific time or when a specific event occurs, following the backup policy of a respective data source 220. In some embodiments, the BMS 205 may continuously collect security incident metrics that represent the security status of a data source system, and aggregate these metrics to generate a compromise confidence score. The BMS 205 may compare the score with one or more defined thresholds and/or previous backups, and dynamically adjust the backup policies (with respect to each given data source system 220) based on the comparison results. In some embodiments, the BMS 205 may store the collected security metrics and the generated compromise confidence scores as metadata associated with each backup. In some embodiments, the BMS 205 may analyze the backups and their associated metadata to identify any potential breaches or intrusions.

In some embodiments, the BMS 205 may allow administrators to define and adjust backup policies through client devices 210. The administrators may use the client devices 210 to send inputs/commands to the BMS 205. Within the inputs/commands, the administrator may set schedules for when backups should occur (e.g., at regular intervals, or based on certain events), adjust backup frequency, specify which storage devices to use, and/or define how long backups should be kept before they are deleted or overwritten.

In some embodiments, the BMS 205 may generate outputs/notifications about the security incident metrics, the detected potential breaches or intrusions, and/or the comparison results with one or more defined thresholds and/or previous backups. In some embodiments, the BMS 205 may transmit the outputs/notifications to client devices 210, notifying the administrator (e.g., or other users who are responsible for security or system management) of the backup status of a respective data source, the potential security threats or breaches, and/or the proactive actions that could be taken in response to the potential compromises. In some embodiments, the BMS 205 may transmit the outputs/notifications to system logs of the respective data source system 220. In some embodiments, when the affected data source system is part of a clustered network or environment, sharing association with other computing systems, the BMS 205 may transmit the outputs/notifications to all associated computing systems within the cluster. Upon receiving the outputs/notifications, the associated computing systems may learn about the potential compromise (e.g., potential security threats or breaches) in the affected data source system. Based on the outputs/notifications, the associated computing systems (or the BMS 205) may tag their backups appropriately, and/or adjust their backup frequencies accordingly, in order to reduce the risk of the potential compromises spreading through the network or cluster. In some embodiments, when the example environment 200 is part of a globally redundant system with disaster recovery failover sites, the BMS 205 may transmit the outputs/notifications to all other sites within the system, keeping all other sites of the globally redundant system informed of the backup status and/or potential threats or breaches in the example environment 200. Relying on the outputs/notifications, the other sites of the globally redundant system may adjust their synchronization or backup policies to align with the potential risks. For example, if the compromise confidence score of backups within the storage devices 215 is higher than the scores of backups at other sites, indicating a lower security state, the other sites may slow down or withhold data replication with the potentially compromised site(s).

In some embodiments, the BMS 205 may send alerts to the client devices 210, the system logs of data sources, or other associated devices, when other significant events occur, such as backups failing, or uncompromised backups being overwritten.

Figure 3A:
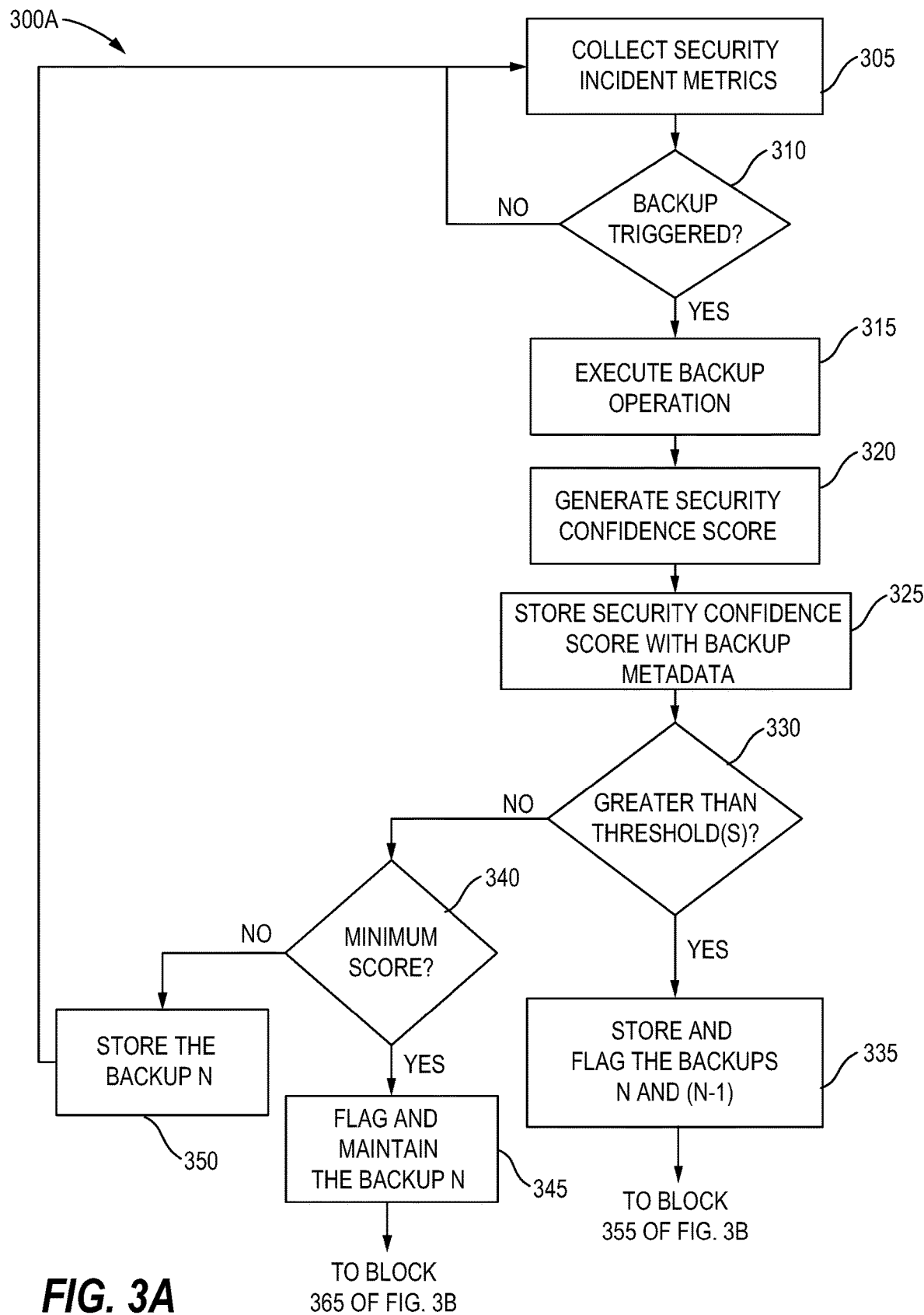
FIGS. 3A-3B depict an example method for dynamic backup management, according to some embodiments of the present disclosure.
Figure 3B:
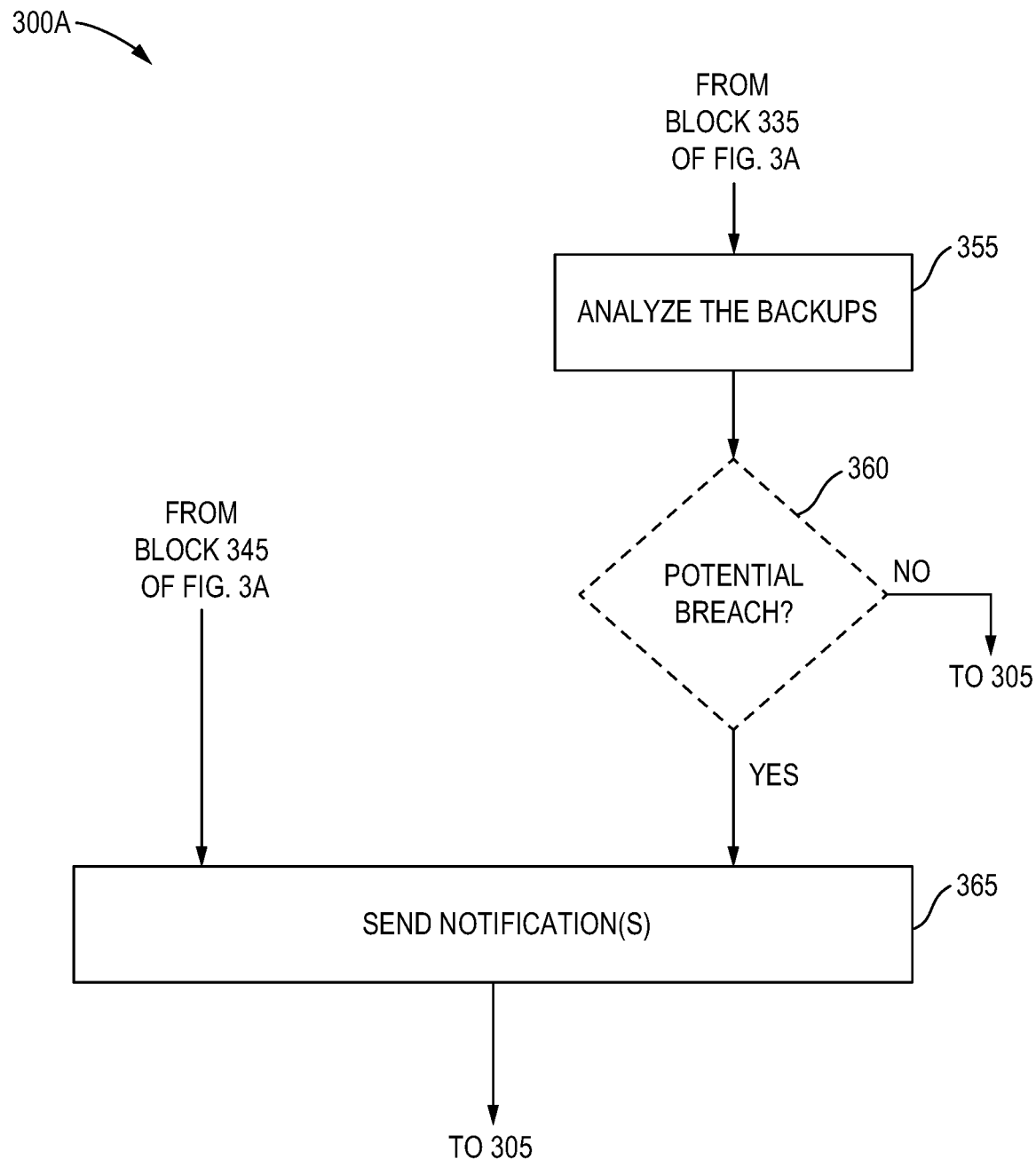
Figure 7:
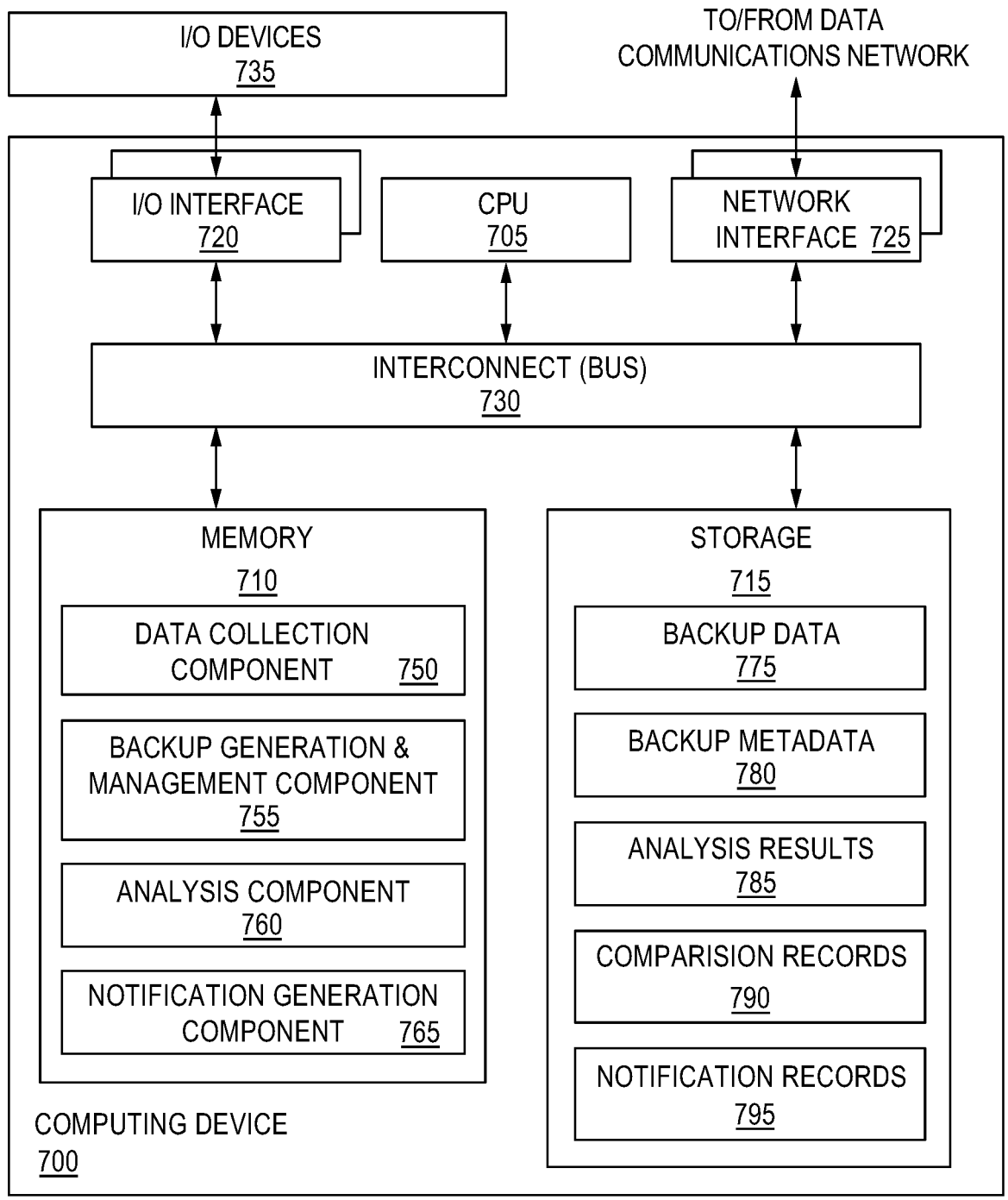
FIG. 7 depicts an example computing device for security metrics analysis and backup management, according to some embodiments of the present disclosure.

FIGS. 3A-3B depict an example method 300 for dynamic backup management, according to some embodiments of the present disclosure. In some embodiments, the method 300A of FIG. 3A and the method 300B of FIG. 3B (collectively, forming a method 300) may be performed by one or more backup management system, such as the computer 101 as illustrated in FIG. 1, the backup management servers (BMSs) 205 as illustrated in FIG. 2, and/or the computing device 700 as illustrated in FIG. 7.

The method 300 begins at block 305, where a backup management system (e.g., 205 of FIG. 2) tracks and collects security incident metrics about a computing system whose data is backed up (also referred to in some embodiments as a data source system) (e.g., 220 of FIG. 2). In some embodiments, these security incident metrics may be collected from various sources within the computing system continuously or at predefined intervals. In some embodiments, the security incident metrics may include system anomalies, intrusion detection data, indicators of compromises, and/or other parameters/metrics indicative of a system's security status. As used herein, "system anomalies" may refer to unusual or unexpected operations or patterns within the system that deviate from its normal or expected operations, such as a sudden surge in network traffic, unusual slowdowns, unexpected rebooting, abnormal levels of data access or usage, and the like. As used here, "intrusion detection data" may refer to data gathered from an intrusion detection system (IDS) that monitors network or system activities, and detects intrusions or policy breaches. The intrusion detection data may include network traffic, system logs, and application activities. As used here, "indicators of compromises" may refer to data that indicates a security incident may have occurred or is currently occurring in the system. The indicators of compromise may include unusual outbound network traffic, anomalies in privilege user account activity, geographical irregularities, log-in red flags, and/or increases in database read volume, among others.

At block 310, the backup management system checks the backup settings to determine whether a backup action is triggered (e.g., based on predefined trigger criteria). If the system determines that the predefined trigger criteria have been satisfied, the method 300 proceeds to block 315, where the backup management system triggers the backup process and executes the actual backup operations. Otherwise, the method 300 returns to 305, where the backup management system continues to monitor the data source system and collect security incident metrics until the criteria are met. In some embodiments, the predefined trigger criteria may be time-based, occurring at regular time intervals (e.g., hourly, daily, weekly, or monthly). The backup management system may check the clock or an internal timer within the system. If the current time matches a scheduled backup time, the backup management system may trigger a backup process. In some embodiments, the predefined trigger criteria may be event-based, where the backup process is triggered when one or more specific events occur. A variety of events may be set up as backup triggers within the event-based system, such as system shutdowns, user logouts, or the completion of certain tasks. In some embodiments, backups may be triggered based on the aforementioned security metrics (e.g., when a metric is equal to or surpass a defined threshold, indicating a potential security incident). For example, when a sudden spike in the network exceeds a certain limit within a specified period, it could indicate a potential attack or intrusion, and the backup management system may trigger an immediate backup to prevent potential data loss in case the attack succeeds.

At block 315, the backup process is triggered. In response, the backup management system executes the backup operations to generate a backup (e.g., backup N) of the data source system (e.g., 220 of FIG. 2).

At block 320, the backup management system assesses the collected security metrics to generate a compromise confidence score (also referred to in some embodiments as a confidence of compromise level). The compromise confidence score serves as a practical measure to quantify the overall security status of the data source system at the time the current backup (e.g., backup N) was made. In some embodiments, the confidence score may quantify the overall security status of the data source system for the time between the previous backup (e.g., backup N-1) and the current backup (e.g., backup N). In some embodiments, the compromise confidence score operates on a scale where a lower score indicates a lower likelihood of system compromise. In other words, the lower the compromise confidence score, the higher the level of confidence that the backup data is uncompromised and therefore safe. In some embodiments, the compromise confidence score may be computed based on a single metric (e.g., system anomalies, intrusion detection data, and/or indicators of compromises). For example, the compromise confidence score may be computed by considering the presence (or absence) and/or severity of the detected system anomalies. In some embodiments, the compromise confidence score may be generated based on a combination of various metrics. The algorithms and weightings used to calculate this score would be designed according to the infrastructure of the data source system, its risk tolerance, the sensitivity of the data it handles, and/or the specific threat models it uses. For example, for a system with a large number of publicly accessible interfaces, the score may lean more towards (or place more weight on) network intrusion detection data. In contrast, in a system secured behind a firewall, internal anomalies or usual system behavior may be assigned more weight in calculating the final compromise confidence score.

At block 325, the backup management system stores the collected security metrics and/or the generated security confidence score as metadata associated with the current backup (e.g., backup N). In some embodiments, the saved metadata, along with the actual backup of data, may be used for further analyses, helping the backup management system understand the security status of the data source system at the time when the backup was made.

At block 330, the backup management system compares the compromise confidence score of the current backup (e.g., backup N) with an evaluation criteria (also referred to in some embodiments as dynamic backup policy criteria). In some embodiments, the backup criteria may include a defined maximum allowable threshold, which represents the highest acceptable level of compromise risk that the specific data source system (or an administrator of the source system) is willing to tolerate. If the compromise confidence score of the current backup (e.g., backup N) exceeds (or is equal to) the threshold, it may indicate a high likelihood of system compromise at the time the backup was made, triggering a significant security concern. In response, the method 300 proceeds to block 335, where the backup management system flags the current backup (e.g., backup N) and the backup immediately preceding the current one (e.g., backup N-1), and saves the flagged backups for future forensic analysis. That is, the backup management system may refrain from deleting or removing the current backup (backup N) and the prior backup (backup N-1), even if existing policies would otherwise result in their deletion (e.g., after some period of time, or after additional backups are made). In some embodiments, the system may store the associated security metrics, the compromise confidence score, as well as any other relevant metadata, along with the backup of data, for future forensic analysis. In some embodiments, the maximum allowable threshold may be adjusted according to the specific risk tolerances of the backup management system and the data source system, the sensitivity of the data being handled, and/or regulatory requirements. Although flagging and retraining two backups (e.g., backup N and backup N-1) is discussed for conceptual clarity, in some embodiments, the backup management system may similarly flag and retain additional backups, such as the last three backups (e.g., backup N-1, backup N-2, and backup N-3).

If the compromise confidence score does not satisfy the backup criteria (e.g., falling below the defined maximum allowable threshold), it may indicate that the data source system was within acceptable risk levels when the current backup was made, suggesting a lower likelihood of system compromise. In response, the method proceeds to block 340, where the backup management system compares the compromise confidence score of the current backup (e.g., backup N) with the scores of all existing backups in the system (e.g., prior backups of the same data source system that have not yet been deleted). If the compromise confidence score of the current backup (e.g., backup N) is determined to be the lowest among all existing backups (indicating the lowest likelihood of compromise), the method 300 moves to block 345, where the backup management system flags and preserves the current backup (e.g., backup N). In some embodiments, the backup management system may flag the backups as "highly reliable" or "most safe." In some embodiments, the backup management system may store the flagged backup in storage with policies set up to prevent it from being discarded or overwritten by backups with higher compromise scores, regardless of the backup retention policy (e.g., which may otherwise result in deleting the oldest backup whenever a new backup is made). In some embodiments, the backup management system may store the associated security metrics, the compromise confidence score, as well as any other relevant metadata, along with the flagged backup data, for future analysis or recovery operations. If the compromise confidence score of the current backup (e.g., backup N) is not the lowest among all existing backups (for the same source system), the method 300 proceeds to block 350, where the backup management system stores the current backup (e.g., backup N) in accordance with existing policies. In some embodiments, the current backup (e.g., backup N) stored in storage may be replaced with a newer backup when it becomes available, or when other policy-based conditions are met, such as when the storage is running out of space, or a cleanup trigger is initiated.

Returning to block 335, the method 300 continues to block 355 (in FIG. 3B), where the backup management system performs a detailed forensic analysis on the flagged backups (e.g., the current backup N and the backup immediate before it (N-1)), and their respective metadata (e.g., security incident metrics, compromise confidence scores). The forensic analysis is configured to detect or determine whether a security breach or intrusion has occurred and/or whether a specific security concerns has been raised, and its corresponding impacts. In some embodiments, the forensic analysis may involve comparing the status of the two neighboring backups to identify significant changes, and/or analyze these changes to identify potentially signal security incidents. In some embodiments, the forensic analysis may involve using advanced algorithms or machine learning (ML) models to detect breaches or intrusions. For example, the ML models may be trained on a relatively large amount of data to learn the normal patterns of behavior within a data source system. At runtime, the trained ML model may take the flagged backups (e.g., the backups N and (N-1)) and their associated metadata (e.g., security incident metrics, compromise confidence scores) as inputs. The ML models may process this data to identify patterns that deviate from normal, expected behavior, which may indicate a breach has occurred or a security issue has been raised. In some embodiments, the output of the ML models may be a prediction of the likelihood of a breach or intrusion, such as a probability score, where higher values indicate a higher likelihood of a breach or intrusion. In some embodiments, the output of the ML models may be a binary classification. For example, the outputs may classify the current state of backup as "normal" or "anomalous," where the anomalous output would indicate the presence of a breach or intrusion. In some embodiments, the outputs of the ML models may further include recommended proactive actions that should be taken in response to the detected breaches or intrusions. For example, if a high likelihood of a breach is determined, the model may suggest generating an immediate backup of the data source system, initiating an immediate investigation, and/or sending an alert to relevant responsible parties.

At block 360, the backup management system determines whether a breach or intrusion has occurred (or a likelihood of a breach or intrusion might occur) based on the analysis of the backups and their associated metadata. If the system determines that certain breaches or intrusions might occur (e.g., the likelihood of the occurrence of a breach or intrusion exceeds a defined threshold, or classifying the current backup as "anomalous"), the method 300 proceeds to block 365, where the backup management system generates notifications. Otherwise, the method 300 returns to block 305, where the backup system continues to monitor the data source and collect security incident metrics. In some embodiments, the process as depicted from block 305 to block 365 may be repeated for each of N+1 backups, and upon evaluation and comparison of confidence of compromises levels, a backup policy of the computing system may be modified.

In some embodiments, the method 300 may skip block 360, where the backup management system generates notifications regardless of the detection of any potential breaches or intrusions. In some embodiments, the notification may include the security incident metrics of the flagged backups, the detections of any potential breaches or intrusions, and/or the comparison results between the compromise scores and one or more defined thresholds (e.g., the comparison result between the compromise score of backup N and the predefined maximum allowable threshold, or the comparison results between the compromise score of backup N and that from all existing backups). In some embodiments, the notification may also include recommended proactive actions that could be taken in response to the potential threats or breaches.

The generated notifications may be transmitted to various receiving parties. For example, in some embodiments, the notifications may be transmitted to a client device (e.g., 210 of FIG. 2), informing the administrator of the security status of the data source system. In some embodiments, the notifications may be transmitted to the system logs of the data source system. In some embodiments, when the affected data source system is part of a clustered network or computing environment, the notifications may be transmitted to all other computing systems within the cluster. In some embodiments, when the backup management system is part of a globally redundant system with disaster recovery failover sites, the notifications may be transmitted to all other sites within the system. After transmitting the notifications, the method 300 returns back to block 305, where the backup system continues to monitor the data source and collect security incident metrics. In some embodiments, besides sending the notifications, the backup management system may implement other proactive actions in response to the detected threats or breaches. For example, the backup management system may generate an immediate backup of the data source system and preserve this backup for further analysis and recovery operations. The backup management system may initiate an immediate investigation of the system logs, network activities, user log-in activities, and/or other signs of malicious activities. In addition, the system may increase the frequency of backups during a period of high risk to ensure the safe and uncompromised copies of the data are maintained.

Figure 4:
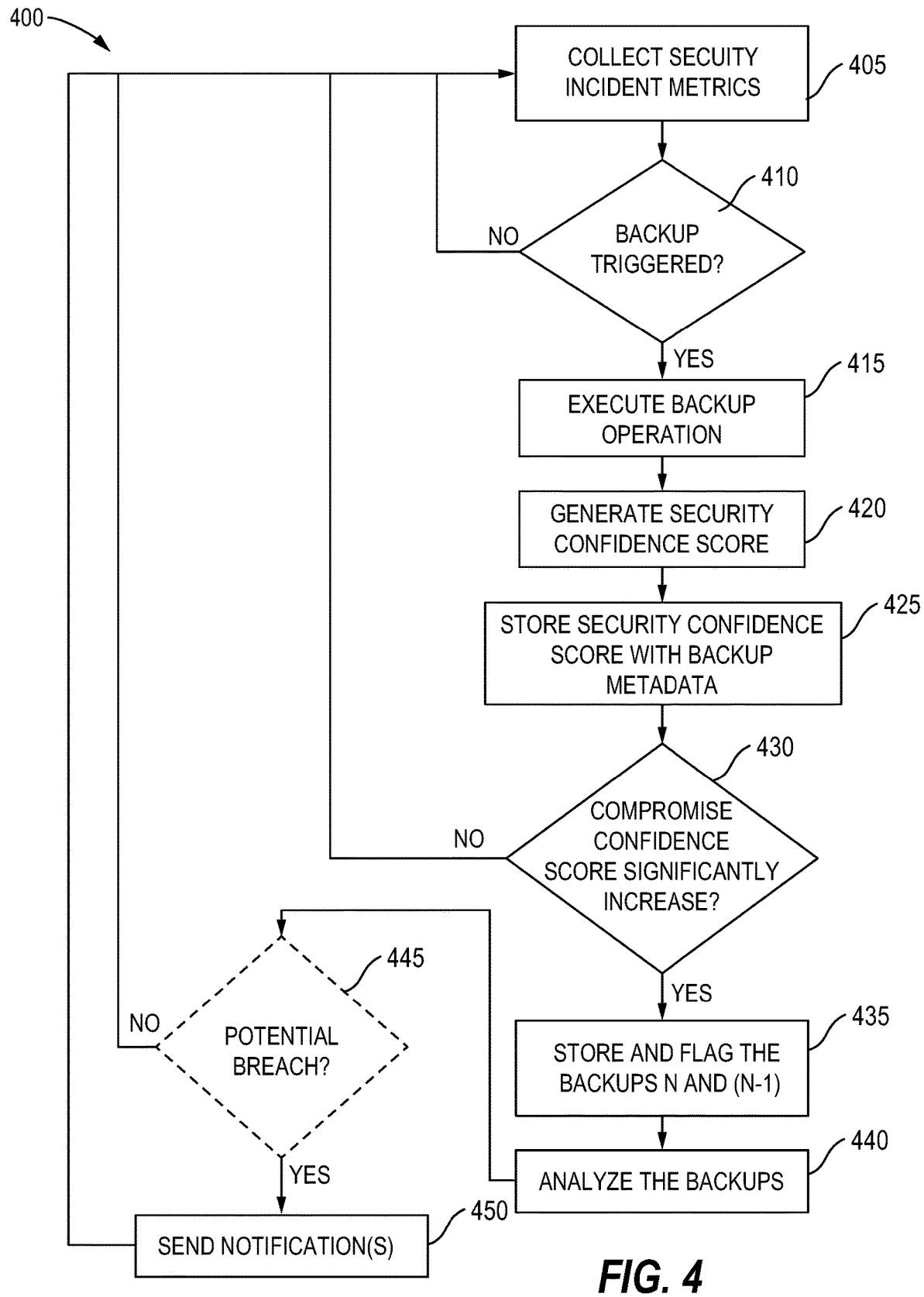
FIG. 4 depicts an example method for dynamic backup management based on security confidence changes, according to some embodiments of the present disclosure.
Figure 6:
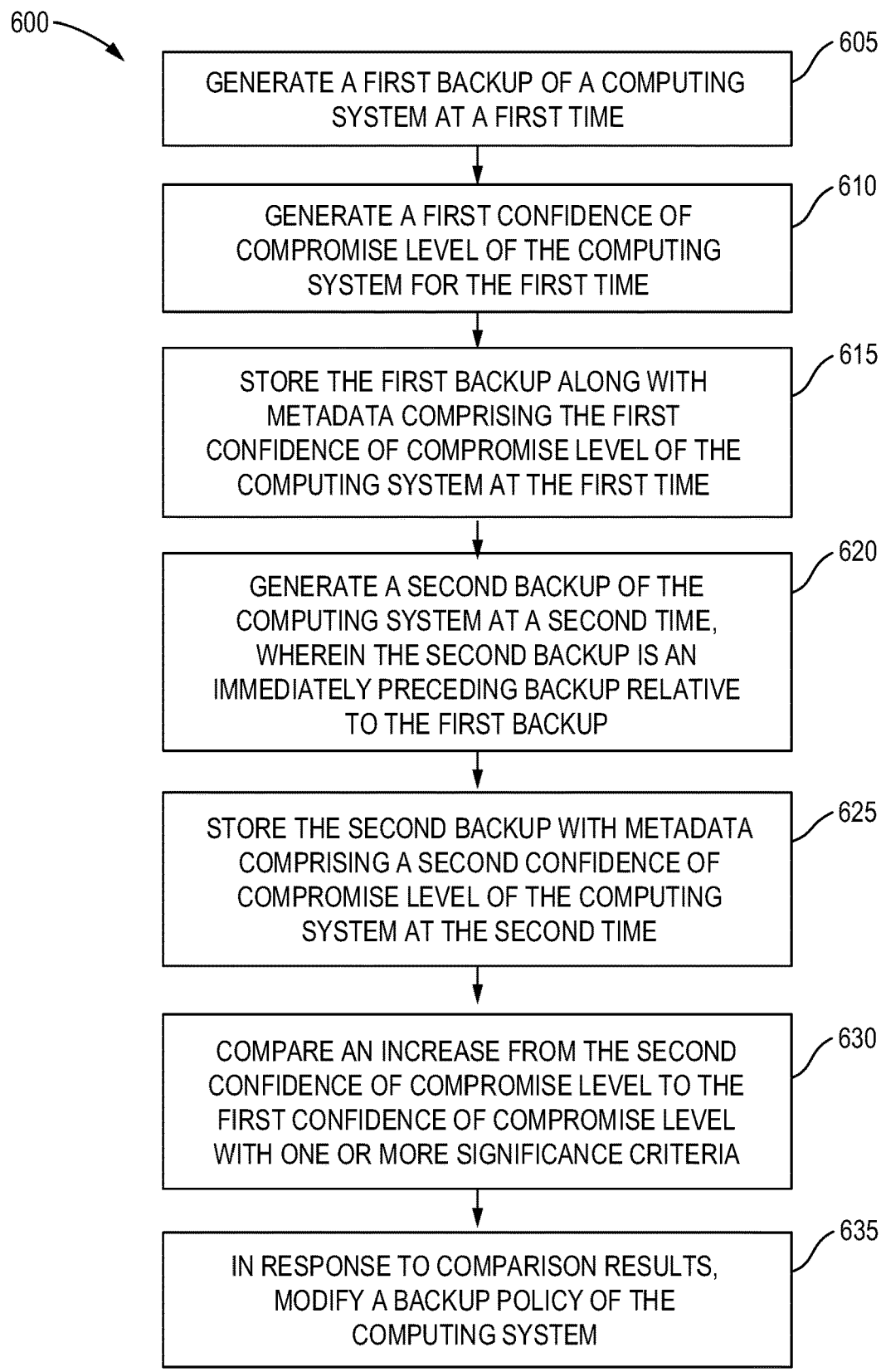
FIG. 6 depicts a flow diagram depicting an example method for adjusting backup policies upon detecting significant changes in confidence of compromise level, according to some embodiments of the present disclosure.

FIG. 4 depicts an example method 400 for dynamic backup management based on compromise confidence changes, according to some embodiments of the present disclosure. In some embodiments, the method 400 of FIG. 4 may be performed by one or more backup management system, such as the computer 101 as illustrated in FIG. 1, the backup management servers (BMSs) 245 as illustrated in FIG. 2, and/or the computing device 700 as illustrated in FIG. 6. As depicted here, the steps from blocks 405 to 425 within the method 400 largely mirror the steps from blocks 305 to 325 within the method 300. In some embodiments, the method 300 of FIG. 3 and the method 400 of FIG. 4 may be combined and jointly performed by one or more backup management system, such as the computer 101 as illustrated in FIG. 1, the backup management servers (BMSs) 245 as illustrated in FIG. 2, and/or the computing device 700 as illustrated in FIG. 6.

The method 400 begins at block 405, where a backup management system tracks and collects security incident metrics from a data source system (e.g., 220 of FIG. 2). As stated above, in some embodiments, the security incident metrics may include system anomalies, intrusion detection data, indicators of compromises, and/or other parameters/metrics indicative of a system's security status.

At block 410, the backup management system checks if a backup action is triggered, based on one or more predefined trigger criteria. If it is determined that a backup action has been triggered, the method 400 proceeds to block 415, where the backup management system executes the backup operations and generates a backup (e.g., backup N) of the data source system (e.g., 220 of FIG. 2). If it is determined that a backup action has not been triggered, the method 400 returns to block 405, where the backup management system continues to monitor the data source system and collect security incident metrics until a backup action is triggered.

At block 420, the backup management system generates a compromise confidence score (also referred to in some embodiments as a confidence of compromise level) based on one or more collected security metrics. In some embodiments, the compromise confidence score may be used to quantify the overall security level of the data source system when the current backup (e.g., backup N) was made. A lower compromise confidence score may indicate a lower likelihood of system compromise, and, therefore, imply a higher level of system security. For example, a data backup with a 10% compromise confidence score suggests that the system has a higher integrity compared to another backup with a 20% compromise confidence score. In some embodiments, a significant increase in the compromise confidence score between two neighboring backups (e.g., backups N and (N-1)), such as from 10% to 30%, may suggest the occurrence of potential breaches or intrusions. The significant increase in the score may server as an alert for the backup management system, indicating a heightened risk that requires further analysis and investigation.

At block 425, the backup management system saves the collected security metrics and/or the generated security confidence score as metadata associated with the current backup (e.g., backup N).

At block 430, the backup management system identifies whether there has been a significant increase in the compromise confidence score between the two neighboring backups. In some embodiments, the identification process may begin with comparing the compromise confidence score of the current backup (e.g., backup N) with that of the immediately preceding backup (e.g., backup N-1) to calculate the increase between the two backups. After the increase (or change) is computed, the system may then compare the increase (or change) with a significance criteria. In some embodiments, the significance criteria may include a defined significance threshold, which served to distinguish a "normal" or "tolerable" increase in confidence scores from a "significant" increase that suggests potential system compromises (e.g., policy breaches or intrusions). In some embodiments, the defined significance threshold may be determined based on a variety of factors, including (but not limited to) the risk tolerances of the backup management system and the data source system, the infrastructure of the data source system, the sensitivity of the data being handled, the historical data regarding the compromise confidence scores, and/or regulatory requirements.

If the increase meets the significance criteria (e.g., exceeding (or is equal to) the defined significance threshold), indicating there has been a significant increase in the compromise confidence score between the current backup (e.g., backup N) and the immediately preceding backup (e.g., backup N-1), the method 400 proceeds to block 435. At block 435, the backup management system flags the two neighboring backups (e.g., backups N and (N-1)), and stores the flagged backups for future forensic analysis. If the increase falls below the defined significance threshold, suggesting that there is no significant increase in the compromise confidence score, the method 400 returns to block 405, where the backup management system continues to monitor the data source system and collect relevant security incident metrics.

At block 440, the backup management system analyzes the flagged backups (e.g., the backups N and (N-1)), and their respective metadata (e.g., security incident metrics, compromise confidence scores) to detect the occurrence of potential breaches or intrusions (e.g., and/or their extents and impacts). In some embodiments, the forensic analysis may involve using advanced algorithms or machine learning (ML) models to detect potential breaches or intrusion.

At block 445, the backup management system determines whether a breach or intrusion has occurred (or a likelihood of a breach or intrusion might occur) based on the analysis results from block 440. If the system determines certain breaches or intrusions might occur (e.g., the likelihood of the occurrence of a breach or intrusion exceeds a defined threshold, or classifying the current backup as "anomalous"), the method 400 proceeds to block 450, where the backup management system generates and transmits notifications to responsible parties. Otherwise, the method 400 returns to block 405, where the backup system continues to monitor the data source and collect security incident metrics. In some embodiments, the process as depicted from block 405 to block 450 may be repeated for each of N+1 backups, and upon evaluation and comparison of confidence of compromises levels, a backup policy of the computing system may be modified.

In some embodiments, the method 400 may skip block 445, where the backup management system generates notifications regardless of the detections of any potential breaches or intrusions. In some embodiments, the notification may include the security incident metrics of the flagged backups, the detections of any potential breaches or intrusions, the increase in compromise confidence scores, and/or the determinations regarding the significance of the increase. The notifications may be transmitted to various parties, such as the data source system, the administrators (e.g., through client devices), other computing systems in the same clustered network, and/or other sites of a globally redundant system. In some embodiments, besides sending the notifications, the backup management system may perform other proactive actions in response to the potential threats or breaches, such as generating an immediate backup of the data source system, initiating an immediate investigation of malicious activities, and/or altering the current backup policies (e.g., increasing the frequency of backups during a period of high risk).

Figure 5:
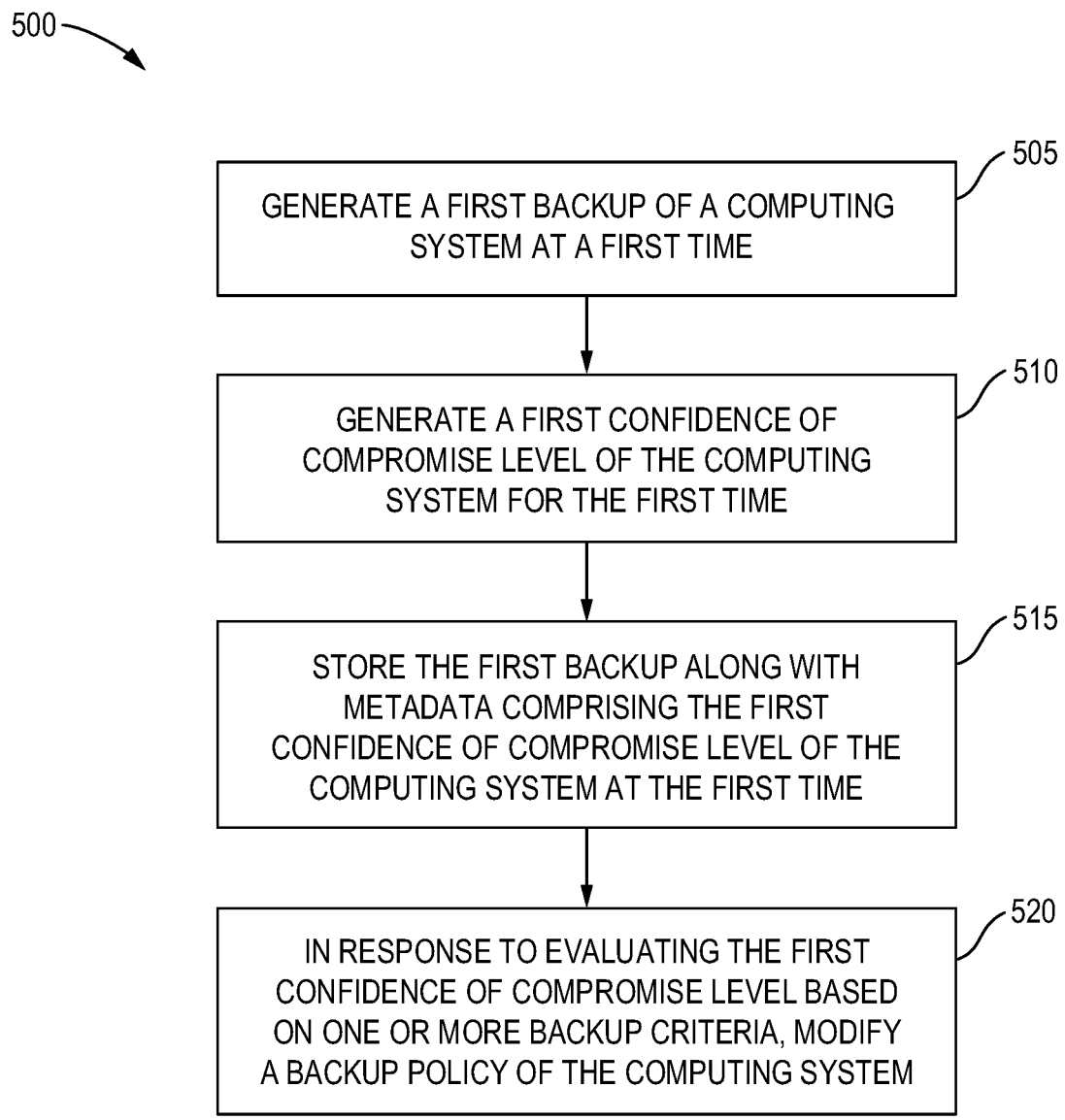
FIG. 5 depicts a flow diagram depicting an example method for adjusting backup policies based on one or more security incident metrics, according to some embodiments of the present disclosure.

FIG. 5 depicts a flow diagram depicting an example method 500 for adjusting backup policies based on one or more security incident metrics, according to some embodiments of the present disclosure.

The method 500 begins at block 505, where a backup management system (e.g., BMS 205 of FIG. 2) generates a first backup of a computing system (e.g., data source 220 of FIG. 2) (as depicted at block 315 of FIG. 3) at a first time.

At block 510, the backup management system generates a first confidence of compromise level of the computing system (e.g., data source 220 of FIG. 2) at the first time (as depicted at block 320 of FIG. 3).

At block 515, the backup management system stores the first backup along with metadata, where the metadata comprises the first confidence of compromise level of the computing system (e.g., data source 220 of FIG. 2) at the first time (as depicted at block 325 of FIG. 3). In one embodiment, the first confidence of compromise level is determined based at least in part on system anomalies, intrusion detections, or indicators of compromise.

At block 520, the backup management system evaluates the first confidence of compromise level based on one or more backup criteria (as depicted at block 330 of FIG. 3). In response to the evaluation results, the backup management system modifies a backup policy of the computing system. In one embodiment, the process of modifying the backup policy comprises, upon determining that the first confidence of compromise level satisfies the one or more backup criteria, storing the first backup and a second backup for forensic analysis, where the second backup corresponds to an immediately preceding backup, relative to the first backup (as depicted at block 335 of FIG. 3). In other embodiments, the process of modifying the backup policy comprises, upon determining that the first confidence of compromise level is a minimum across existing backups of the computing system, retaining the first backup of data (as depicted at block 345 of FIG. 3).

In some embodiments, the backup management system may further generate a second backup of the computing system at a second time, where the second backup is an immediately preceding backup relative to the first backup; store the second backup along with metadata, where the metadata comprises a second confidence of compromise level of the computing system at the second time; and compare an increase from the second confidence of compromise level to the first confidence of compromise level with one or more significance criteria (as depicted at block 430 of FIG. 4). In some embodiments, the backup management system, upon determining that the increase satisfies the one or more significance criteria, may store the first backup and the second backup for forensic analysis (as depicted at block 435 of FIG. 4).

In some embodiments, the backup management system may further analyze the first and second backups to detect a potential breach (as depicted at block 355 of FIG. 3), and initiate an immediate backup of the computing system in response to detections of the potential breach. In some embodiments, the process of initiating an immediate backup of the computing system may comprise at least one of capturing current states of the computing system, generating a new backup of data stored on the computing system, or recording relevant metadata.

In some embodiments, the backup management system may further notify one or more other computing systems of the modified backup policy and the evaluation results, where the one or more other computing systems are in a clustered system with the computing system (as depicted at block 365 of FIG. 3). In some embodiments, each of the one or more other computing systems, upon receiving notifications, may tag at least one respective backup with metadata indicating the modified backup policy and the evaluation results, and adjust a frequency of backups in response to the modified backup policy and the evaluation results.

FIG. 6 depicts a flow diagram depicting an example method 600 for adjusting backup policies upon detecting significant changes in confidence of compromise level, according to some embodiments of the present disclosure.

The method 600 begins at block 605, where a backup management system (e.g., BMS 205 of FIG. 2) generates a first backup of a computing system (e.g., data source 220 of FIG. 2) at a first time (as depicted at block 415 of FIG. 4).

At block 610, the backup management system generates a first confidence of compromise level of the computing system (e.g., data source 220 of FIG. 2) for the first time (as depicted at block 420 of FIG. 4).

At block 615, the backup management system stores the first backup along with metadata, where the metadata comprises the first confidence of compromise level of the computing system (e.g., data source 220 of FIG. 2) at the first time (as depicted at block 425 of FIG. 4).

At block 620, the backup management system generates a second backup of the computing system at a second time, where the second backup is an immediately preceding backup relative to the first backup.

At block 625, the backup management system stores the second backup along with metadata, where the metadata comprises a second confidence of compromise level of the computing system at the second time. In one embodiment, the first and second confidence of compromise levels are determined based at least in part on system anomalies, intrusion detections, or indicators of compromise.

At block 630, the backup management system compares an increase from the second confidence of compromise level to the first confidence of compromise level with one or more significance criteria (as depicted at block 430 of FIG. 4).

At block 635, the backup management system modifies a backup policy of the computing system in response to comparison results. In one embodiment, the process of modifying the backup policy may comprise, upon determining that the increase exceeds the one or more significance criteria, storing the first backup and the second backup for forensic analysis (as depicted at block 435 of FIG. 4).

In some embodiments, the backup management system may further analyze the first and second backups to detect a potential breach (as depicted at block 440 of FIG. 4), and initiate an immediate backup of the computing system in response to detections of the potential breach. In some embodiments, the backup management system may further notify one or more other computing systems of the modified backup policy and the comparison results, where the other computing systems are in a clustered system with the computing system (as depicted at block 450 of FIG. 4).

FIG. 7 depicts an example computing device 700 for security metrics analysis and backup management, according to some embodiments of the present disclosure. Although depicted as a physical device, in embodiments, the computing device 700 may be implemented using virtual device(s), and/or across a number of devices (e.g., in a cloud environment). The computing device 700 can be embodied as any computing device, such as the computer 101 as illustrated in FIG. 1, or the backup management server(s) 205 as illustrated in FIG. 2.

As illustrated, the computing device 700 includes a CPU 705, memory 710, storage 715, one or more network interfaces 725, and one or more I/O interfaces 720. In the illustrated embodiment, the CPU 705 retrieves and executes programming instructions stored in memory 710, as well as stores and retrieves application data residing in storage 715. The CPU 705 is generally representative of a single CPU and/or GPU, multiple CPUs and/or GPUs, a single CPU and/or GPU having multiple processing cores, and the like. The memory 710 is generally included to be representative of a random access memory. Storage 715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 735 (such as keyboards, monitors, etc.) are connected via the I/O interface(s) 720. Further, via the network interface 725, the computing device 700 can be communicatively coupled with one or more other devices and components (e.g., via a network, which may include the Internet, local network(s), and the like). As illustrated, the CPU 705, memory 710, storage 715, network interface(s) 725, and I/O interface(s) 720 are communicatively coupled by one or more buses 730.

In the illustrated embodiment, the memory 710 includes a data collection component 750, a backup generation & management component 755, an analysis component 760, and a notification generation component 765.

Although depicted as a discrete component for conceptual clarity, in some embodiments, the operations of the depicted component (and others not illustrated) may be combined or distributed across any number of components. Further, although depicted as software residing in memory 710, in some embodiments, the operations of the depicted components (and others not illustrated) may be implemented using hardware, software, or a combination of hardware and software.

In one embodiment, the data collection component 750 may track and collect security-related data (also referred to in some embodiments as security incident metrics) from various sources within a data source system (e.g., 220 of FIG. 2). The security-related data may include various aspects, including (but not limited to) system anomalies, intrusion detection data, and indicators of compromises. The collected data may then be used to generate compromise confidence scores and determine dynamic backup policies.

In one embodiment, the backup generation & management component 755 may monitor and check backup triggers continuously, and communicate with a data source system to initiate a backup process when backup triggers are satisfied. After a backup of data (e.g., backup N) is created, the backup generation & management component 755 may calculate a compromise confidence score for the backup, using the security metrics collected by the data collection component 750. The score may provide a quantified assessment of the overall security of the data source system at the time the backup (e.g., backup N) was made. As stated above, the compromise confidence score may be computed based on a single metric (e.g., system anomalies, intrusion detection data, and/or indicators of compromises), a combination of various metrics. Along with the backup, the backup generation & management component 755 may generate metadata. The metadata may include the security incident metrics collected by the data collection component 750, the generated compromise confidence score, and other relevant details. The metadata may be stored along with its associated backup data, and provided to the analysis component 760 for further analysis.

In one embodiment, the analysis component 760 may compare the compromise confidence score generated by the backup generation & management component 755 with one or more backup criteria. In some embodiments, the analysis component 760 may compare the compromise confidence score with a defined maximum allowable threshold, to determine if the current backup (e.g., backup N) meets the set security standards. In some embodiments, the analysis component 760 may compare the score with that from all existing data backups, to determine whether the current backup has the minimum score, and is therefore most likely uncompromised and having higher integrity across all other backups. In some embodiments, the analysis component 760 may compare the score with that from a previous backup (e.g., backup N-1) to determine the trends in system security. The previous backup (e.g., backup N-1) may occur immediately preceding the current backup (e.g., back N).

After the comparisons are complete, in some embodiments, the analysis component 760 may send the comparison results to the backup generation & management component 755, which, upon receiving the results, adjusts the backup policy as necessary. The adjustment may include changing backup intervals, preserving certain backups regardless of retention policy, and/or marking certain backups for future forensic analysis. For example, in some embodiment, upon determining the score of the current backup (e.g., backup N) is higher than (or equal to) the maximum allowable threshold, the backup generation & management component 755 may take a snapshot of the current backup (e.g., backup N) and the immediately preceding backup (e.g., backup N-1), and save it for future forensic analysis. In some embodiments, after the analysis component 760 determines that the score of the current backup is the lowest across all existing backups, the backup generation & management component 755 may preserve the current backup (e.g., backup N), and adjust policy to prevent it from being discarded or overwritten by new backups with higher compromise scores, regardless of the backup retention policy. In some embodiments, when an increase between the current backup (e.g., backup N) and the immediately preceding backup (e.g., backup N-1) is computed and determined to surpass (or be equal to) a defined significance threshold, suggesting potential system compromises, the backup generation & management may save and flag the two neighboring backups for future forensic analysis.

In one embodiment, after the backups suggesting potential system compromises are flagged and saved, the analysis component 760 may perform a detailed forensic analysis on the flagged backups (e.g., the current backup N and the backup immediately before it (N-1)), and their respective metadata (e.g., security incident metrics, compromise confidence scores), to detect whether a breach or intrusion has occurred. In some embodiments, the analysis component 760 may use trained ML models to examine patterns, anomalies, and deviations from established baselines in the backup data. As stated above, in some embodiments, the ML model may generate a prediction of the likelihood of a breach or intrusion that might occur (e.g., a probability score). In some embodiments, the outputs of the ML models may include a binary classification, classifying the backup as "normal" or "anomalous", where the anomalous output indicates the presence of a breach or intrusion. In some embodiments, the outputs of the ML models may further include recommended proactive actions that could be taken in response to mitigate the impacts of the detected breaches or intrusions.

In some embodiments, the analysis component 760 may transmit the analysis results to the backup generation & management component 755. The backup generation & management component 755 may take proactive actions in response to the detected breaches or intrusions, based on the received analysis results. In some embodiments, the backup generation & management component 755 may send commands to the notification generation component 765, instructing it to generate and send notifications to relevant parties, such as the system logs of the data source system (e.g., 220 of FIG. 2), the client devices (e.g., 210 of FIG. 2). In some embodiments, if the affected data source system is associated with other computing systems in a clustered network or environment, the backup generation & management component 755 may instruct the notification generation component 765 to transmit the notifications to all associated computing systems. In some embodiments, the notification may include the forensic analysis details, the detections of any potential breaches or intrusions, the security status of the data source system (e.g., security incident metrics, the compromise confidence scores), and/or the comparison results between the compromise scores and one or more defined thresholds. Upon receiving the notifications, the associated computing systems may assess the reported information and adjust their backup policies accordingly. For example, if the compromise confidence score of the data source system has increased significantly, indicating heightened risk, the other system may decide to increase their backup frequency, perform internal checks, and/or other security measures to prevent breaches or intrusions. In some embodiments, when a globally redundant system with disaster recovery failover sites is involved, the backup generation & management component 755 may instruct the notification generation component 765 to transmit the notifications to all other sites within the system. Based on the notifications, the other sites of the globally redundant system may adjust their synchronization policies to align with the reported potential risks. For example, if the compromise confidence score of the data source system is higher than the scores of backups at other sites, indicating a lower safe security state, the other sites may slow down or withhold data replication.

In some embodiments, besides sending notifications, the backup generation & management component 755 may implement other proactive actions in response to the detected threats or breaches. For example, in some embodiments, the backup generation & management component 755 may generate an immediate backup of the data source system, and preserve the backup for further analysis and recovery operations. In some embodiments, the backup generation & management component 755 may initiate an immediate investigation of the system logs, network activities, user log-in activities, and/or other signs of malicious activities. In some embodiments, the backup generation & management component 755 may increase the frequency of backups during a period of high risk to ensure the safe and uncompromised copies of the data are maintained.

In the illustrated example, the storage 715 may include backups of data 775 from the data source system, the metadata 780 associated with each backup, the analysis results 785 (e.g., generated by the analysis component 760), the comparison results 790 in compromise confidence level (e.g., generated by the backup generation & management component 755), and the notification records 795. In some embodiments, the aforementioned information may be saved in a remote database (e.g., 215 of FIG. 2) that connects to the computing device 700 via a network.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

While the foregoing is directed to embodiments of the present invention, other and further embodiments of the invention may be devised without departing from the basic scope thereof, and the scope thereof is determined by the claims that follow.

What is claimed is:
1. A method comprising:
generating a first backup of a computing system at a first time;
generating a first confidence score of a compromise level for the first backup, comprising:
identifying at least one of system anomalies, intrusion detection data, or indicators of compromise as input metrics,
assigning a weight to each of the input metrics based on an infrastructure of the computing system, and
calculating the first confidence score using a scoring algorithm that combines the weighted metrics;
storing the first backup along with metadata comprising the first confidence score of the compromise level;
in response to a determination that the first confidence score of the compromise level exceeds a risk allowable threshold, modifying a backup policy of the computing system to retain the first backup and a second backup, wherein the second backup corresponds to an immediately preceding backup relative to the first backup;
training a machine learning (ML) model for forensic analysis using historical system data and a selected training algorithm;
determining a likelihood of a breach by analyzing the first and second backups using the ML model, comprising:
extracting a feature set from the first and second backups, the feature set comprising the first confidence score associated with the first backup, a second confidence score associated with the second backup, and one or more security incident metrics,
providing the feature set as input to the trained ML model, and determining the likelihood of a breach based on inference from the trained ML model; and in response to a determination that the likelihood exceeds a defined threshold, sending a notification of the detected breach and the modified backup policy to one or more other computing systems.

2. The method of claim 1, wherein the first confidence score of the compromise level is determined based at least in part on at least one of (i) system anomalies; (ii) intrusion detections; or (iii) indicators of compromise.

3. The method of claim 1, wherein the backup policy, before modification, specifies to delete the second backup upon generation of the first backup and expiration of a defined time interval.

4. The method of claim 1, further comprising:

in response to a determination that the first confidence score of the compromise level is a minimum across existing backups of the computing system, retaining the first backup of data.

5. The method of claim 1, further comprising:

generating a second backup of the computing system at a second time, wherein the second backup is an immediately preceding backup relative to the first backup;

storing the second backup with metadata comprising a second confidence score of the compromise level of the computing system at the second time; and comparing an increase from the second confidence score to the first confidence score with one or more significance criteria.

6. The method of claim 5, further comprising:

in response to determining that the increase satisfies the one or more significance criteria, retaining the first backup and the second backup for forensic analysis.

7. The method of claim 1, further comprising:

in response to a determination that the likelihood exceeds the defined threshold, initiating a third backup of the computing system, comprising at least one of capturing current states of the computing system, generating a new backup of the computing system, or recording relevant metadata.

8. The method of claim 1, wherein the one or more other computing systems are in a clustered system with the computing system.

9. The method of claim 1, wherein the one or more other computing systems share access to data stored in one or more backup sets with the computing system.

10. A system, comprising:

one or more computer processors; and one or more memories collectively containing one or more programs which when executed by the one or more computer processors performs an operation, the operation comprising:

generating a first backup of a computing system at a first time;

generating a first confidence score of a compromise level for the first backup, comprising:

identifying at least one of system anomalies, intrusion detection data, or indicators of compromise as input metrics, assigning a weight to each of the input metrics based on an infrastructure of the computing system, and calculating the first confidence score using a scoring algorithm that combines the weighted metrics;

storing the first backup along with metadata comprising the first confidence score of the compromise level;

in response to a determination that the first confidence score of the compromise level exceeds a risk allowable threshold, modifying a backup policy of the computing system to retain the first backup and a second backup, wherein the second backup corresponds to an immediately preceding backup relative to the first backup;

training a machine learning (ML) model for forensic analysis using historical system data and a selected training algorithm;

determining a likelihood of a breach by analyzing the first and second backups using the ML model, comprising:

extracting a feature set from the first and second backups, the feature set comprising the first confidence score associated with the first backup, a second confidence score associated with the second backup, and one or more security incident metrics, providing the feature set as input to the trained ML model, and determining the likelihood of a breach based on inference from the trained ML model; and in response to a determination that the likelihood exceeds a defined threshold, sending a notification of the detected breach and the modified backup policy to one or more other computing systems.

11. The system of claim 10, wherein the first confidence score of the compromise level is determined based at least in part on at least one of (i) system anomalies; (ii) intrusion detections; or (iii) indicators of compromise.

12. The system of claim 10, wherein the backup policy, before modification, specifies to delete the second backup upon generation of the first backup and expiration of a defined time interval.

13. The system of claim 10, wherein the operation further comprising:

generating a second backup of the computing system at a second time, wherein the second backup is an immediately preceding backup relative to the first backup;

storing the second backup with metadata comprising a second confidence score of the compromise level of the computing system at the second time; and comparing an increase from the second confidence score to the first confidence score with one or more significance criteria.

14. The system of claim 13, wherein the operation further comprises:

in response to determining that the increase satisfies the one or more significance criteria, retaining the first backup and the second backup for forensic analysis.

15. The system of claim 10, wherein the one or more other computing systems are in a clustered system with the computing system.

16. A computer program product comprising one or more computer-readable storage media collectively containing computer-readable program code that, when executed by operation of one or more computer processors, performs an operation comprising:

generating a first backup of a computing system at a first time;

generating a first confidence score of a compromise level for the first backup, comprising:

identifying at least one of system anomalies, intrusion detection data, or indicators of compromise as input metrics, assigning a weight to each of the input metrics based on an infrastructure of the computing system, and calculating the first confidence score using a scoring algorithm that combines the weighted metrics;

storing the first backup along with metadata comprising the first confidence score of the compromise level;

in response to a determination that the first confidence score of the compromise level exceeds a risk allowable threshold, modifying a backup policy of the computing system to retain the first backup and a second backup, wherein the second backup corresponds to an immediately preceding backup relative to the first backup;

training a machine learning (ML) model for forensic analysis using historical system data and a selected training algorithm;

determining a likelihood of a breach by analyzing the first and second backups using the ML model, comprising:
  extracting a feature set from the first and second backups, the feature set comprising the first confidence score associated with the first backup, a second confidence score associated with the second backup, and one or more security incident metrics,
  providing the feature set as input to the trained ML model, and
    determining the likelihood of a breach based on inference from the trained ML model; and
  in response to a determination that the likelihood exceeds a defined threshold, sending a notification of the detected breach and the modified backup policy to one or more other computing systems.

17. The computer program product of claim 16, wherein the first confidence score of the compromise level is determined based at least in part on at least one of (i) system anomalies; (ii) intrusion detections; or (iii) indicators of compromise.

18. A method comprising:
generating a first backup of a computing system at a first time;
generating a first confidence score of a compromise level for the first backup, comprising:
  identifying at least one of system anomalies, intrusion detection data, or indicators of compromise as input metrics,
  assigning a weight to each of the input metrics based on an infrastructure of the computing system, and
  calculating the first confidence score using a scoring algorithm that combines the weighted metrics;
storing the first backup along with metadata comprising the first confidence score of the compromise level; and
generating a second backup of the computing system at a second time, wherein the second backup is an immediately preceding backup relative to the first backup;
storing the second backup with metadata comprising a second confidence score of compromise level for the second backup;
comparing an increase from the second confidence score to the first confidence score with one or more significance criteria;
in response to comparison results, modifying a backup policy of the computing system to retain the first backup and the second backup;
training a machine learning (ML) model for forensic analysis using historical system data and a selected training algorithm;
determining a likelihood of a breach by analyzing the first and second backups using the ML model, comprising:
  extracting a feature set from the first and second backups, the feature set comprising the increase, the first confidence score associated with the first backup, the second confidence score associated with the second backup, and one or more security incident metrics,
  providing the feature set as input to the trained ML model, and
    determining the likelihood of a breach based on inference from the trained ML model; and
  in response to a determination that the likelihood exceeds a defined threshold, sending a notification of the detected breach and the modified backup policy to one or more other computing systems.

19. A system, comprising:
one or more computer processors; and
one or more memories collectively containing one or more programs which when executed by the one or more computer processors performs an operation, the operation comprising:
  generating a first backup of a computing system at a first time;
  generating a first confidence score of a compromise level for the first backup, comprising:
    identifying at least one of system anomalies, intrusion detection data, or indicators of compromise as input metrics,
    assigning a weight to each of the input metrics based on an infrastructure of the computing system, and
    calculating the first confidence score using a scoring algorithm that combines the weighted metrics;
  storing the first backup along with metadata comprising the first confidence score of the compromise level; and
  generating a second backup of the computing system at a second time, wherein the second backup is an immediately preceding backup relative to the first backup;
  storing the second backup with metadata comprising a second confidence score of compromise level for the second backup;
  comparing an increase from the second confidence score to the first confidence score with one or more significance criteria;
  in response to comparison results, modifying a backup policy of the computing system to retain the first backup and the second backup;
  training a machine learning (ML) model for forensic analysis using historical system data and a selected training algorithm;
  determining a likelihood of a breach by analyzing the first and second backups using machine leaning (ML) the ML model, comprising:
    extracting a feature set from the first and second backups, the feature set comprising the increase, the first confidence score associated with the first backup, the second confidence score associated with the second backup, and one or more security incident metrics,
    providing the feature set as input to the trained ML model, and
      determining the likelihood of a breach based on inference from the trained ML model; and
    in response to a determination that the likelihood exceeds a defined threshold, sending a notification of the detected breach and the modified backup policy to one or more other computing systems.

* * * * *